(12) United States Patent
Boyle et al.

(10) Patent No.: US 12,454,017 B2
(45) Date of Patent: Oct. 28, 2025

(54) STABILIZED CUTTING TOOL ASSEMBLIES

(71) Applicant: FISHER CONTROLS INTERNATIONAL LLC, Marshalltown, IA (US)

(72) Inventors: Adam T. Boyle, Singapore (SG); Michael C. Anderson, Singapore (SG)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 176 days.

(21) Appl. No.: 18/387,645

(22) Filed: Nov. 7, 2023

(65) Prior Publication Data

US 2024/0066615 A1 Feb. 29, 2024

Related U.S. Application Data

(62) Division of application No. 16/712,352, filed on Dec. 12, 2019, now Pat. No. 11,833,598.

(Continued)

(51) Int. Cl.
*B23D 47/02* (2006.01)
*B23D 47/12* (2006.01)
(Continued)

(52) U.S. Cl.
CPC .......... *B23D 47/02* (2013.01); *B23D 47/12* (2013.01); *B23D 59/025* (2013.01); *B33Y 40/20* (2020.01)

(58) Field of Classification Search
CPC ....... B23D 47/12; B23D 47/005; B23D 47/02
See application file for complete search history.

(56) References Cited

U.S. PATENT DOCUMENTS 2,348,588 A * 5/1944 Arsneau ................. B27B 17/086
144/34.1
2,894,583 A * 7/1959 Johnstad .................. B24D 5/12
188/106 R (Continued)

FOREIGN PATENT DOCUMENTS

CN 212762178 U 3/2021
EP 1 375 042 A1 1/2004

(Continued)

OTHER PUBLICATIONS

"Complete Machining Solutions Rotating Tool Lines," *Metric Version Catalog 2017*, www.iscar.com; pp. 277-328.

(Continued)

*Primary Examiner* — Sean M Michalski
(74) *Attorney, Agent, or Firm* — MARSHALL, GERSTEIN & BORUN LLP

(57) ABSTRACT

Stabilized cutting tool assemblies. A cutting tool assembly for use with a reference surface includes a tool holder having a rotational axis. The tool holder is arranged for attachment to a drive source arranged to rotate the tool holder and move the tool holder relative to a reference surface. The cutting tool assembly includes a rotatable cutting tool coupled to the tool holder. The cutting tool includes a cutting surface and has a first portion and a second portion. The first portion is disposed adjacent the tool holder. The cutting tool assembly includes a stabilizer coupled to the cutting tool adjacent the second portion. The stabilizer has a bearing surface. The bearing surface is positioned on the second portion to abut the reference surface and to stabilize the cutting tool when the drive source moves the tool holder and the cutting tool to a position adjacent the reference surface.

20 Claims, 15 Drawing Sheets

Related U.S. Application Data

(60) Provisional application No. 62/779,940, filed on Dec. 14, 2018.

(51) Int. Cl.
  *B23D 59/02* (2006.01)
  *B33Y 40/20* (2020.01)

(56) References Cited

U.S. PATENT DOCUMENTS

| | | | | |
|---|---|---|---|---|
| 3,431,821 A * | 3/1969 | McDonald | B23Q 9/0028 |
| | | | 409/177 |
| 4,241,633 A * | 12/1980 | De Luca | B26D 7/2621 |
| | | | 83/676 |
| 4,507,999 A * | 4/1985 | Dezern | B23D 35/004 |
| | | | 83/665 |
| 4,620,821 A * | 11/1986 | Roth | B27B 33/20 |
| | | | 83/854 |
| 4,729,193 A * | 3/1988 | Gant | B24B 45/006 |
| | | | 409/231 |
| 4,787,147 A * | 11/1988 | Wiley | F16D 1/087 |
| | | | 403/247 |
| 4,827,996 A * | 5/1989 | Cotton | B23Q 9/0028 |
| | | | 144/136.95 |
| 4,907,920 A * | 3/1990 | Lund | B23P 13/00 |
| | | | 407/55 |
| 4,920,947 A * | 5/1990 | Scott | B27B 17/025 |
| | | | 125/21 |
| RE33,335 E * | 9/1990 | Gentischer | B24B 23/02 |
| | | | 451/342 |
| 4,970,927 A * | 11/1990 | Benuzzi | B23Q 1/5456 |
| | | | 144/368 |
| 4,984,614 A * | 1/1991 | Landers | B27G 13/08 |
| | | | 144/373 |
| 4,989,374 A * | 2/1991 | Rudolf | B24B 23/022 |
| | | | 451/344 |
| 5,013,193 A | 5/1991 | Rabo et al. | |
| 5,157,873 A * | 10/1992 | Rudolf | B24B 23/022 |
| | | | 403/349 |
| 5,423,358 A * | 6/1995 | Rautio | B23D 61/025 |
| | | | 144/41 |
| 5,447,086 A * | 9/1995 | Wittmaier | B26D 7/2621 |
| | | | 83/676 |
| 5,597,268 A * | 1/1997 | Izumi | B23C 5/1054 |
| | | | 407/53 |
| 5,615,718 A * | 4/1997 | Venditto | B23Q 35/104 |
| | | | 144/135.2 |
| 5,996,659 A * | 12/1999 | Burgess | B27G 13/14 |
| | | | 144/92 |
| 6,050,163 A * | 4/2000 | Gravely | B23D 59/02 |
| | | | 83/171 |
| 6,354,347 B1 * | 3/2002 | Brewer | B27G 13/14 |
| | | | 144/135.2 |
| 6,431,799 B1 * | 8/2002 | Francis | B23C 5/08 |
| | | | 407/42 |
| 6,571,451 B2 * | 6/2003 | Satran | B23P 15/34 |
| | | | 409/234 |
| 6,938,532 B2 * | 9/2005 | Hofmann | B27B 5/34 |
| | | | 83/698.41 |
| 6,953,197 B2 * | 10/2005 | Hartmann | B27B 5/32 |
| | | | 403/321 |
| 7,150,589 B2 * | 12/2006 | Nordlin | B23B 51/101 |
| | | | 144/237 |
| 7,736,101 B2 * | 6/2010 | Dubell | B23C 5/10 |
| | | | 82/1.11 |
| 8,118,018 B1 | 2/2012 | Sherment | |
| 8,250,958 B2 * | 8/2012 | Chen | B23D 47/126 |
| | | | 30/267 |
| 8,997,618 B1 * | 4/2015 | Majcen | B24B 45/006 |
| | | | 83/698.41 |
| 9,481,044 B2 * | 11/2016 | Kaufmann | B23G 5/18 |
| 9,751,138 B2 * | 9/2017 | Morrison | B23F 21/128 |
| 9,776,257 B2 * | 10/2017 | Ueno | B23C 3/00 |
| 9,919,366 B2 * | 3/2018 | Orlov | B23C 5/10 |
| 10,751,814 B2 * | 8/2020 | Kemmler | B23C 5/10 |
| 2002/0170408 A1 * | 11/2002 | Hartmann | B27B 5/32 |
| | | | 83/666 |
| 2003/0000363 A1 * | 1/2003 | Hofmann | B23D 45/165 |
| | | | 83/837 |
| 2003/0041717 A1 * | 3/2003 | Evenson | B23D 45/16 |
| | | | 83/860 |
| 2003/0084773 A1 * | 5/2003 | Joo | A01D 34/6806 |
| | | | 83/665 |
| 2003/0202849 A1 * | 10/2003 | Gamble | B23C 5/2226 |
| | | | 407/41 |
| 2004/0022594 A1 * | 2/2004 | Hecht | B23C 5/28 |
| | | | 408/231 |
| 2005/0126803 A1 * | 6/2005 | Zaiser | B24B 23/04 |
| | | | 173/217 |
| 2005/0217452 A1 * | 10/2005 | McDonnell | B23D 47/126 |
| | | | 83/860 |
| 2006/0120813 A1 * | 6/2006 | Satran | B23C 5/08 |
| | | | 407/48 |
| 2007/0081872 A1 * | 4/2007 | Blomstedt | B23C 5/10 |
| | | | 409/234 |
| 2007/0081873 A1 * | 4/2007 | Blomstedt | B23C 5/10 |
| | | | 409/234 |
| 2008/0022537 A1 * | 1/2008 | Clarke | B25F 3/00 |
| | | | 30/388 |
| 2008/0232910 A1 * | 9/2008 | Hecht | B23C 5/24 |
| | | | 407/104 |
| 2010/0150680 A1 * | 6/2010 | Cherng | B23Q 5/046 |
| | | | 409/231 |
| 2011/0179931 A1 * | 7/2011 | Menze | B27B 5/32 |
| | | | 83/698.41 |
| 2012/0039676 A1 * | 2/2012 | Marshansky | B23C 5/1072 |
| | | | 407/56 |
| 2013/0145634 A1 * | 6/2013 | Cuzdey | B27B 9/02 |
| | | | 30/376 |
| 2014/0105697 A1 * | 4/2014 | Osawa | B23G 7/02 |
| | | | 408/57 |
| 2014/0150622 A1 * | 6/2014 | Wen | F16C 33/586 |
| | | | 83/838 |
| 2015/0298225 A1 * | 10/2015 | Ueno | B64C 1/12 |
| | | | 407/56 |
| 2017/0368618 A1 * | 12/2017 | Harris | B23D 45/006 |
| 2018/0141233 A1 * | 5/2018 | Charest | E04G 21/16 |
| 2019/0168305 A1 | 6/2019 | Boyle | |
| 2019/0224764 A1 * | 7/2019 | Harris | B23D 45/021 |
| 2020/0215626 A1 * | 7/2020 | Hecht | B23C 5/08 |

FOREIGN PATENT DOCUMENTS

| | | |
|---|---|---|
| EP | 2263819 A2 | 12/2010 |
| EP | 3321018 A1 | 5/2018 |

OTHER PUBLICATIONS

"ISCAR Milling Product Line," 2018 ISCAR Ltd., Manufacturer of Metalworking Tools (Iscar.com).

International Search Report and Written Opinion for PCT/US2019/065845, mailed Mar. 27, 2020.

First Office Action, Chinese Patent Application No. 201911286324.5, dated Jan. 11, 2023.

Examination Report, Gulf Cooperation Council Patent Application No. 2019-38823, dated Apr. 27, 2021.

Instruction Manual for Crain No. 575 Multi-Undercut Saw (Year: 2019).

* cited by examiner

STABILIZED CUTTING TOOL ASSEMBLIES

FIELD OF THE DISCLOSURE

The present patent relates generally to cutting tools used in manufacturing processes such as, for example, additive manufacturing processes and, in particular, relates to stabilized cutting tool assemblies for use in such manufacturing processes.

BACKGROUND

In some additive manufacturing processes (e.g., powder bed fusion), one or more parts are produced on a build platform by melting and fusing material together. After the parts are produced, the parts can be removed from the build platform using a cutting tool referred to as a slitter or a slotter.

SUMMARY

In accordance with a first example, a cutting tool assembly includes a tool holder having a rotational axis. The tool holder being arranged for attachment to a drive source arranged to rotate the tool holder about the rotational axis and move the tool holder relative to a reference surface. The cutting tool assembly includes a cutting tool removably coupled to the tool holder to rotate with the tool holder about the rotational axis. The cutting tool includes a cutting surface and having a first portion arranged for placement adjacent to the reference surface. The cutting tool assembly includes a stabilizer carried by the first portion of the cutting tool. The stabilizer has a bearing surface. The bearing surface is arranged to be positioned against the reference surface. Contact between the stabilizer and the reference surface stabilizes the cutting tool when the drive source rotates and/or moves the tool holder and the cutting tool relative to the reference surface.

In accordance with a second example, a cutting tool assembly includes a drive source having a rotatable chuck assembly and movable relative to a reference surface. The cutting tool assembly includes a tool holder removably attachable to the chuck assembly. The tool holder is rotatable about a rotational axis. A cutting tool is removably coupled to the tool holder and arranged to rotate with the tool holder about the rotational axis. The cutting tool includes a cutting surface. The cutting tool assembly includes a stabilizing component carried by a portion of the cutting tool. The stabilizing component having a bearing surface arranged to be positioned against the reference surface. Contact between the stabilizing component and the reference surface stabilizes the cutting tool when the drive source rotates and/or moves the tool holder and the cutting tool relative to the reference surface.

In accordance with a third example, a method includes providing a drive source having a rotatable chuck assembly and movable relative to a reference surface. The method includes providing a tool holder removably attachable to the chuck assembly. The tool holder is rotatable about a rotational axis. The method includes providing a cutting tool arranged to be removably coupled to the tool holder and arranged to rotate with the tool holder about the rotational axis, and providing a cutting surface on the cutting tool. The method includes securing a stabilizing component to a portion of the cutting tool. The stabilizing component being provided with a bearing surface. The method includes moving the drive source to position the cutting tool to a position adjacent to the reference surface. The method includes using the drive source to rotate the tool holder and the cutting tool bringing the stabilizing component into contact with the reference surface to thereby stabilize the cutting tool.

In further accordance with the foregoing first, second and/or third examples, an apparatus and/or method may further include any one or more of the following:

In an example, the bearing surface is arranged on the first portion of the cutting tool in a pattern that surrounds the rotational axis.

In another example, the pattern is disc-shaped.

In another example, the pattern is discontinuous and includes a plurality of sections.

In another example, the bearing surface includes a plurality of bearings disposed in a bearing race.

In another example, the tool holder includes a fluid passage, and the cutting tool includes an aperture in flow communication with the fluid passage. The passage and the aperture cooperating to permit the flow of a fluid from the fluid passage, through the aperture, and past the stabilizer.

In another example, the flow of fluid goes through an aperture in the stabilizer.

In another example, the first portion of the cutting tool includes a recess. At least a portion of the stabilizer is disposed in the recess.

In another example, further including a guard surrounding at least a portion of the stabilizer.

In another example, the guard is compressible.

In another example, the guard is a continuous ring.

In another example, the guard includes a brush.

In another example, the stabilizer includes a ceramic.

In another example, the stabilizer includes a protrusion.

In another example, the protrusion is centered about the rotational axis.

In another example, the stabilizer includes a compressible portion.

In another example, the stabilizing component includes a contact layer applied to the portion of the cutting tool. The contact layer is formed of a material that is dissimilar to a material of the cutting surface of the cutting tool.

In another example, the contact layer is arranged in a circular pattern about the rotational axis.

In another example, the stabilizing component includes bearings disposed in a bearing race, and arranged about the rotational axis.

In another example, the tool holder includes a fluid passage and the cutting tool includes an aperture. The fluid passage and the aperture are arranged to communicate a fluid to an area adjacent the stabilizing component.

In another example, the method includes forming the stabilizing component as a contact layer applied to the portion of the cutting tool, and forming the contact layer of a material that is dissimilar to a material of the cutting surface of the cutting tool.

In another example, the method includes arranging the contact layer in a circular pattern about the rotational axis.

In another example, the method includes forming the circular pattern as a disc, a ring, or as a series of discontinuous sections.

In another example, the method includes providing a circular guard concentric with the stabilizing component.

In another example, the method includes providing the tool holder with a fluid passage and providing the cutting tool with an aperture, and arranging the fluid passage and the aperture to communicate a fluid to an area adjacent the stabilizing component.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
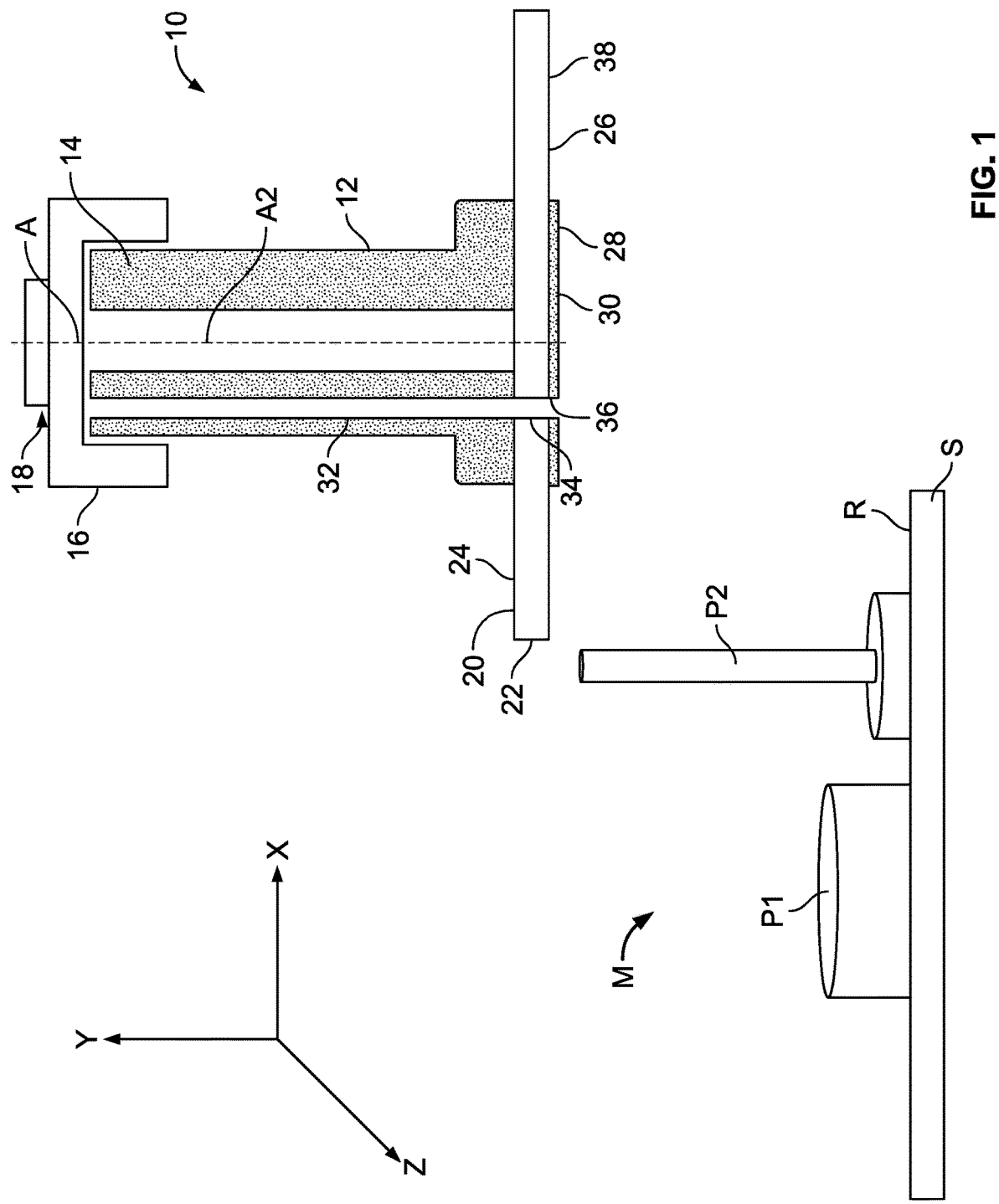
FIG. 1 illustrates is a cutting tool assembly assembled in accordance with the teachings of this disclosure.

Referring now to the drawings, FIG. 1 illustrates a cutting tool assembly 10 assembled in accordance with a first disclosed example of the present invention. In accordance with the disclosed example, the cutting tool assembly 10 is arranged for use with respect to a reference surface R, which may be formed on a substrate S. The reference surface R and the substrate S may be commonly employed on an additive manufacturing machine M, which can be used to make, for example, various parts P1 and P2. The cutting tool assembly 10 may be used to trim, cut, shape, etc., one or more surfaces of the parts P1 and P2, and may also be used to remove the parts P1 and P2 from the substrate S. In one implementation, the reference surface R may be formed by or be a part of the build platform. In other implementations, the reference surface R may be a component that is separate from the build platform.

The cutting tool assembly 10 includes a tool holder 12 having a rotational axis A. Those of skill in the art will appreciate that a shank 14 of the tool holder 12 is attachable to a drive chuck 16 of a drive source 18, with the drive chuck 16 and the drive source 18 being shown schematically in the Figure. The shank 14, the chuck 16, and the drive source 18 may be conventional. Further, those of skill in the art will understand that the drive source and/or the chuck 16 may be movable in or along, for example, the X, Y and/or Z axes, and further may be rotatable about an another axis A2 disposed at an angle relative to the axis A, such that the cutting tool assembly 10 may be positioned as desired relative to the substrate S, the reference surface R, and/or the parts P1 and P2.

A rotatable cutting tool 20 is coupled to the tool holder 12 in any suitable fashion, such as by a plurality of fasteners 21 (see, for example, FIG. 2), or by any other suitable securement mechanism. Thus, the cutting tool 20 may be removable from the tool holder 12. The cutting tool 20 includes a peripheral cutting edge 22, and further includes a first portion 24 and a second portion 26. The first portion 24 is disposed upwardly when viewing FIG. 1, which places the first portion 24 adjacent or otherwise facing the tool holder 12 and the second portion 26 is disposed downwardly and thus facing in a direction opposite the tool holder 12.

A stabilizer 28 is coupled to the cutting tool 20 adjacent the second portion 26 of the cutting tool 20. The stabilizer 28 includes a bearing surface 30, with the bearing surface 30 positioned on or otherwise adjacent to the second portion 26 of the cutting tool 20. Consequently, the bearing surface 30 of the stabilizer 28 may be positioned to abut the reference surface R when the cutting tool assembly 10 is moved to a position adjacent to the reference surface R, which, in accordance with the disclosed example, fosters the stabilization of the cutting tool 20 relative to the reference surface R and the various parts P1, P2. Based on the stabilization provided by the stabilizer 28, the relative length of the tool holder 12 and the shank 14 can be increased without the cutting tool assembly 10 wobbling or otherwise behaving in a manner that decreases the useful life of the cutting tool assembly 10 or the quality of the parts P1, P2 produced.

The bearing surface 30 may be formed of a low-friction material such as ceramic to reduce the friction between the bearing surface 30 and the reference surface R when the bearing surface 30 abuts the reference surface R. Other materials may also prove suitable. It will be understood that the bearing surface will preferably be of a material that is dissimilar to the material used to form the cutting edge of the cutting tool. In this example, the bearing surface 30 is a ring-shape component or pattern that is centered about or otherwise surrounding the axis A. However, the bearing surface 30 can alternatively be a discontinuous pattern and include a plurality of sections arranged about the rotational axis A (see, for example, FIG. 4).

The tool holder 12 includes a passage 32 and the cutting tool 20 includes an aperture 34. The passage 32 of the tool holder 12 and the aperture 34 of the cutting tool 20 are in flow communication with one another to provide a flow path to adjacent the stabilizer 28. The stabilizer 28 also includes an aperture 36 in flow communication with the passage 32 of the tool holder 12 and the aperture 34 of the cutting tool 20. As a result, coolant or lubricant may flow through the passage 32, the aperture 34, and the aperture 36, which are aligned, to move chips away from a movement path of the cutting tool 20 and away from an interface between the bearing surface 30 and the reference surface R when the bearing surface 30 of the stabilizer 28 abuts the reference surface R.

Figure 2:
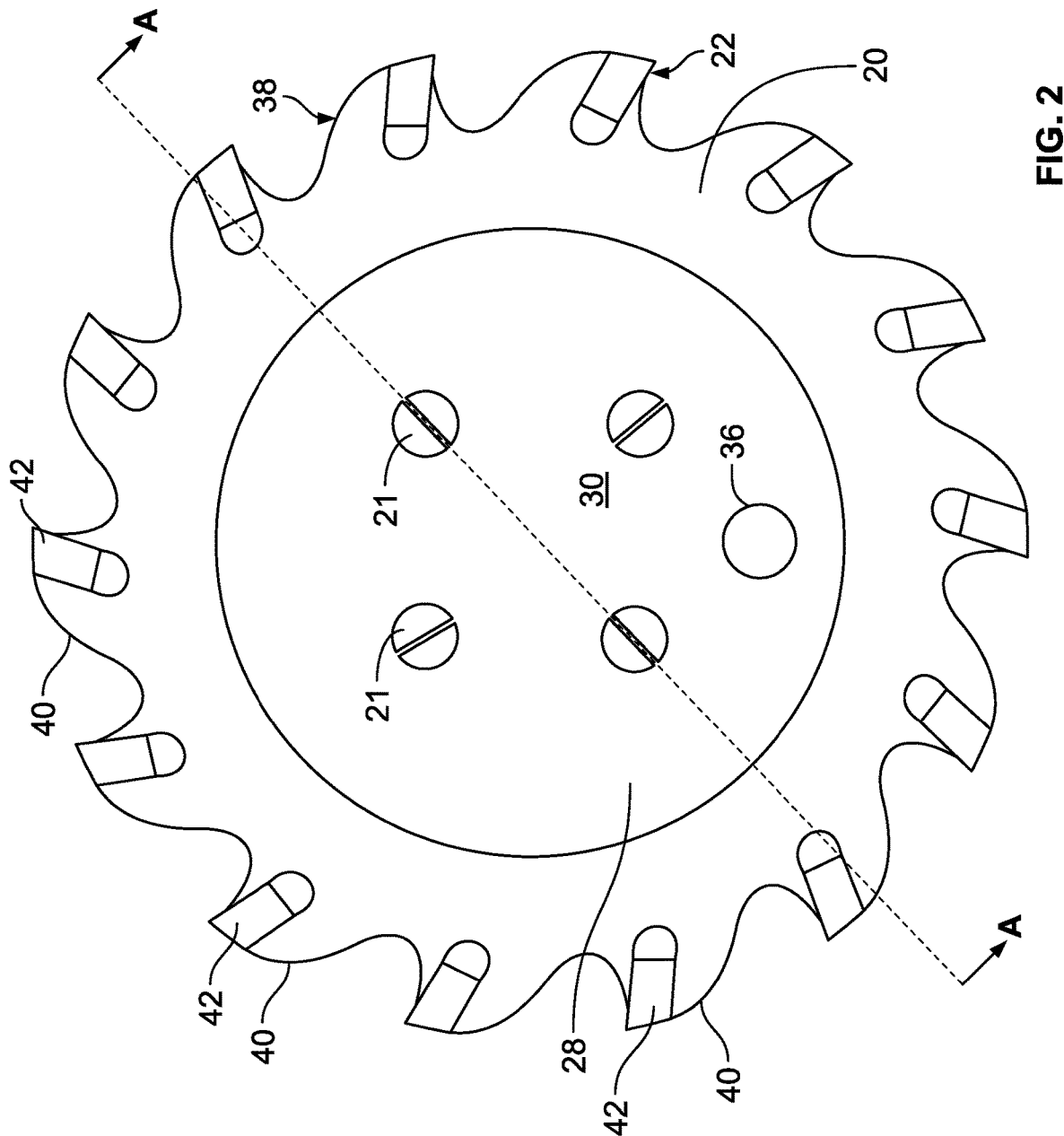
FIG. 2 is a plan view illustrating a cutting tool and a stabilizer of the cutting tool assembly of FIG. 1.

In the example shown in FIGS. 1 and 2, the cutting tool 20 is a disc-shaped saw blade 38 that is coupled to the tool holder 12 via the fasteners 21. The fasteners 21 extend through the saw blade 38 and the stabilizer 28 and are threadably received by the tool holder 12. As also shown in FIG. 2, in the disclosed example, the peripheral cutting edge 22 is formed of a plurality of outwardly extending teeth 40, with each of the teeth 40 preferably having a cutting insert 42. Those of skill in the relevant art will readily understand that the teachings outlined herein may be equally applicable to other forms of cutting tools. For example, teachings may be applied to, for example, the exemplary cutting tools shown in FIGS. 3 through 14.

Figure 3:
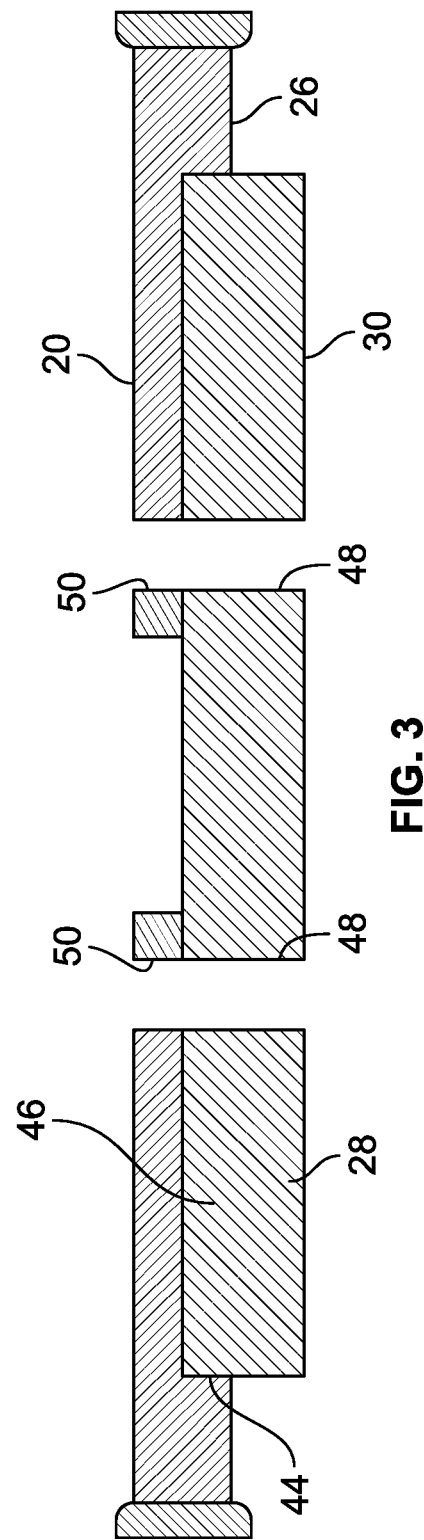
FIG. 3 illustrates a cross-sectional view of the cutting tool and the stabilizer of the cutting tool assembly of FIG. 1 taken along line A-A of FIG. 2.

Referring to FIG. 3, a cross-sectional view of the stabilizer 28 taken along A-A of FIG. 2 is shown. The second portion 26 of the cutting tool 20 includes a recess 44 into which an upper portion 46 of the stabilizer 28 is disposed. The cutting tool 20 and the stabilizer 28 include aligned apertures 48, 50. The fasteners 21 extend through the apertures 48, 50 to couple the cutting tool 20 and the stabilizer 28 to the tool holder 12. While the stabilizer 28 is shown in FIG. 3 received within the recess 44 of the cutting tool 20, alternatively, the cutting tool 20 can include a through hole such that the stabilizer 28 is coupled to the tool holder 12 directly without the cutting tool 20 being positioned between the stabilizer 28 and the tool holder 12.

Figure 4:
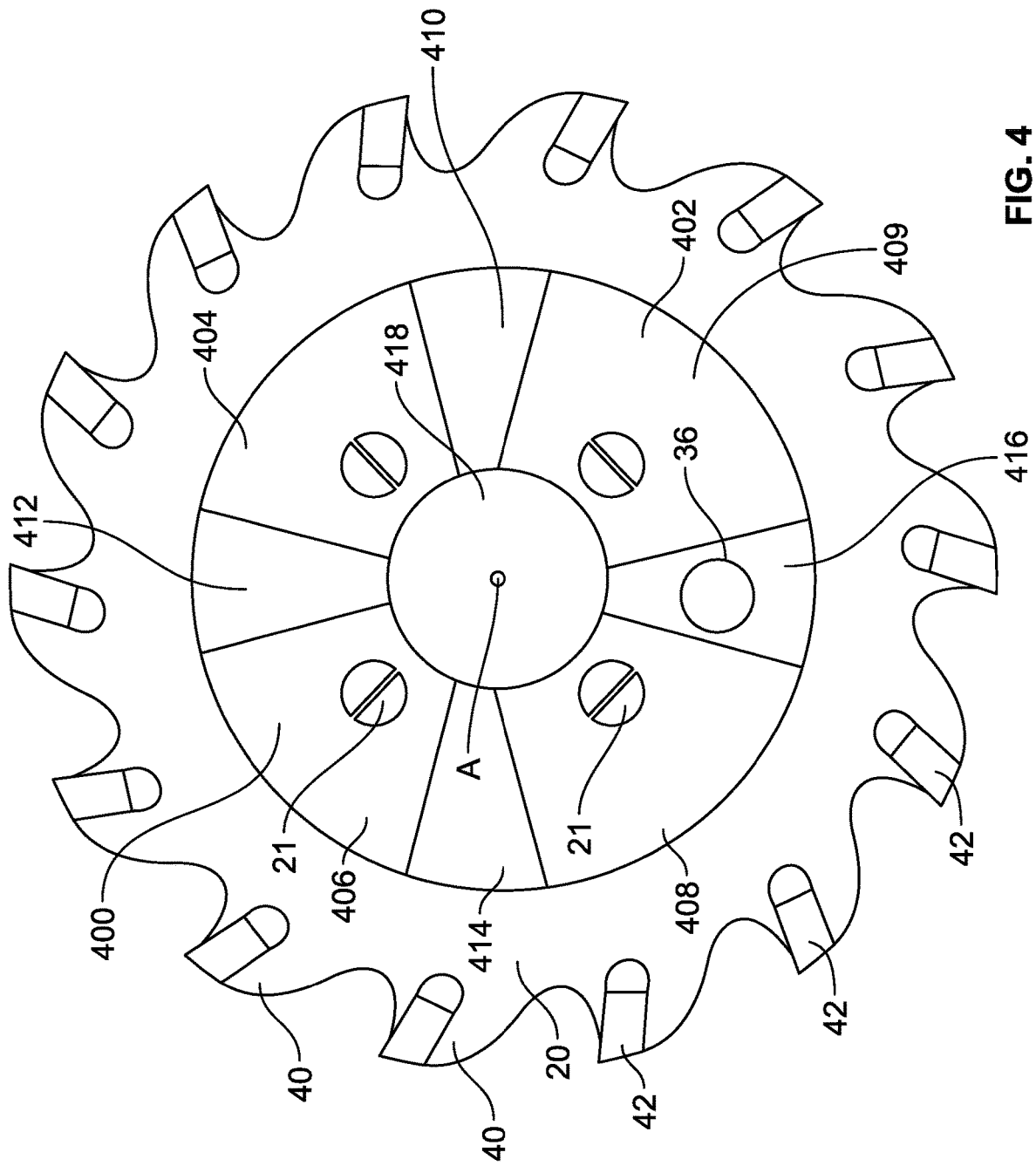
FIG. 4 is a plan view of another stabilizer that can be used with the cutting tool assembly of FIG. 1.

Referring to FIG. 4, another example stabilizer 400 is coupled to the cutting tool 20. The stabilizer 400 is similar to the stabilizer 28 of FIG. 2. However, the stabilizer 400 of FIG. 4 includes a plurality of sections 402, 404, 406, 408 forming a bearing surface 409 that are arranged about the rotational axis A. Channels 410, 412, 414, 416 are defined between the sections 402 through 408. Thus, the bearing surface 409 is discontinuous. A center inset 418 surrounds the rotational axis A and connects the channels 410 through 416. As a result of the channels 410 through 416 and the center inset 418, when the bearing surface 409 of the stabilizer 400 abuts the reference surface R and coolant or lubricant flows through the aperture 36, the coolant or the lubricant can flow through the channels 410 through 416 and the center inset 418 to move chips away from a movement path of the cutting tool 20 and away from an interface between the bearing surface 400 and the reference surface R.

Figure 5:
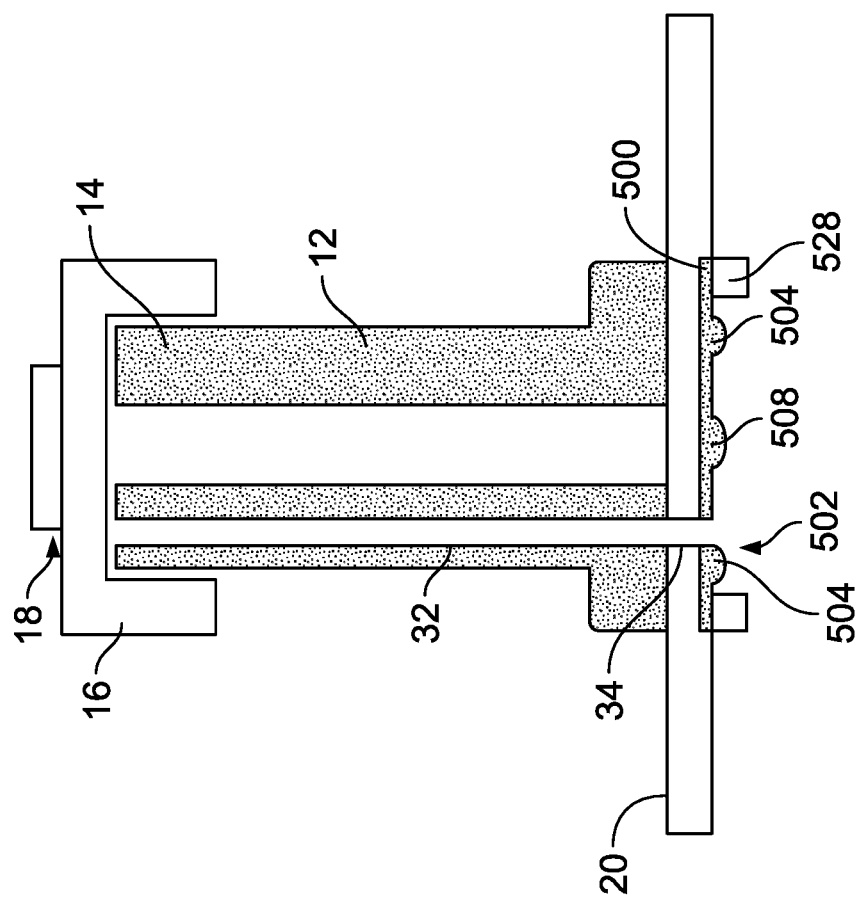
FIG. 5 is a side view of another stabilizer including bearings and a guard that can be used with the cutting tool assembly of FIG. 1.
Figure 6:
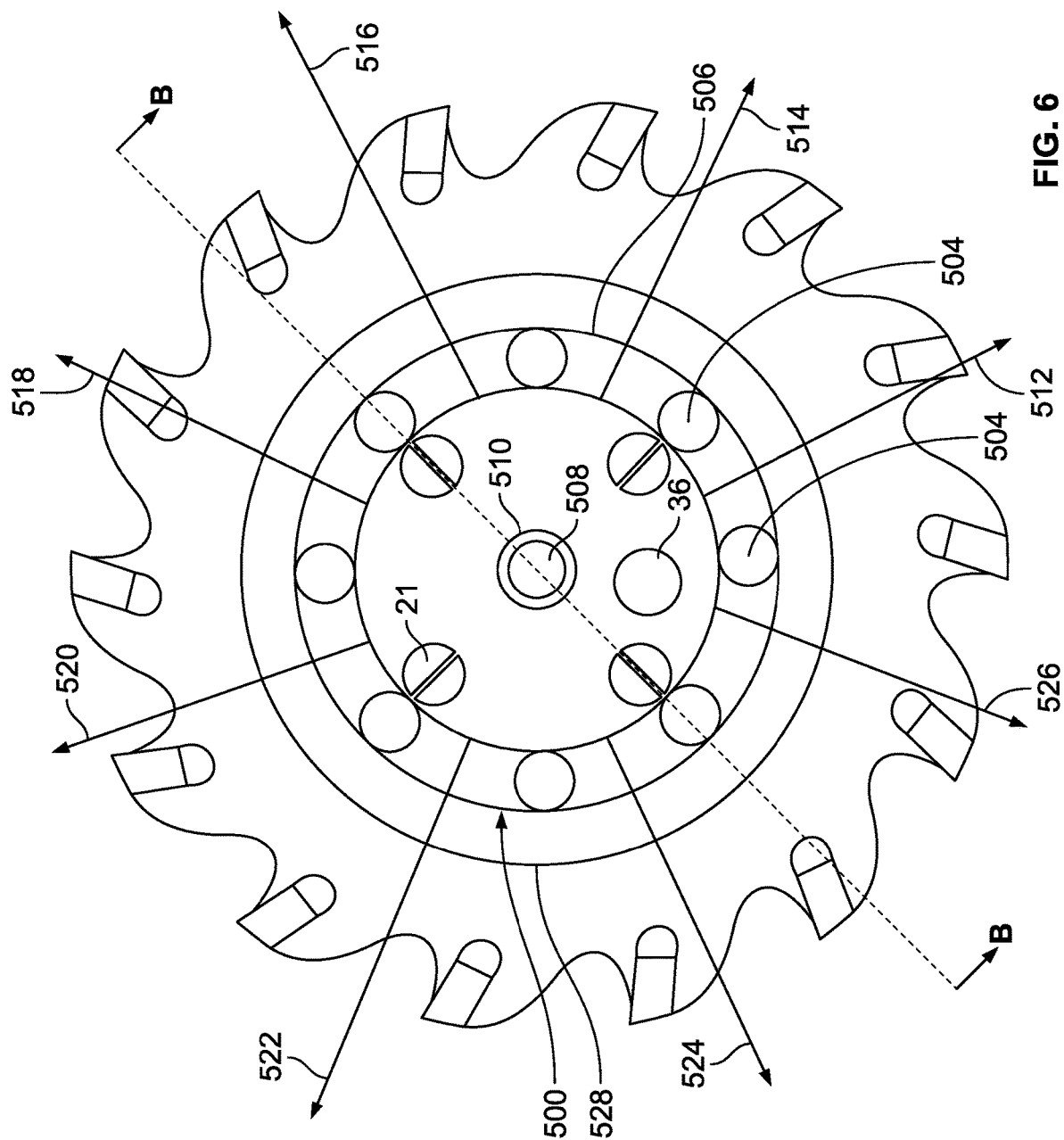
FIG. 6 is a plan view of the stabilizer of FIG. 5.

Referring to FIGS. 5 and 6, another stabilizer 500 is coupled to the cutting tool 20. The stabilizer 500 includes a bearing surface 502. The bearing surface 502 includes first bearings 504 disposed in a bearing race 506 (FIG. 6) and a second bearing 508 disposed in a housing 510 (FIG. 6). Channels 512, 514, 516, 518, 520, 522, 524, 526 (FIG. 6) are defined between the first bearings 504. Thus, when the bearing surface 502 of the stabilizer 500 abuts the reference surface R, lubricant or coolant can flow out of the aperture 36, through the channels 512 through 526 and exit radially from the cutting tool 20.

A guard 528 surrounds at least a portion of the stabilizer 500. When the bearing surface 502 of the stabilizer 500 abuts the reference surface R, the guard 528 deters chips generated during the cutting operation from being positioned within a movement path of the cutter cutting tool 20 and from adversely affecting the bearings 504, 508. The guard 528 may be formed of a continuous ring or a ring-shaped brush. The guard 528 may be compressible via, for example, a compressible buffer, a spring(s), a shock(s) or a high-density foam washer(s). When the guard 528 is compressible, the guard 528 may absorb some of the impact when the cutting tool 20 engages the reference surface R, thereby reducing the likelihood that the cutting tool 20 is damaged. Additionally or alternatively, when the guard 528 is compressible, the guard 528 may compensate for surface finish variations on the reference surfaced R depending on the relative location of the cutting tool 20 on the reference surface R by compressing or expanding.

Figure 7:
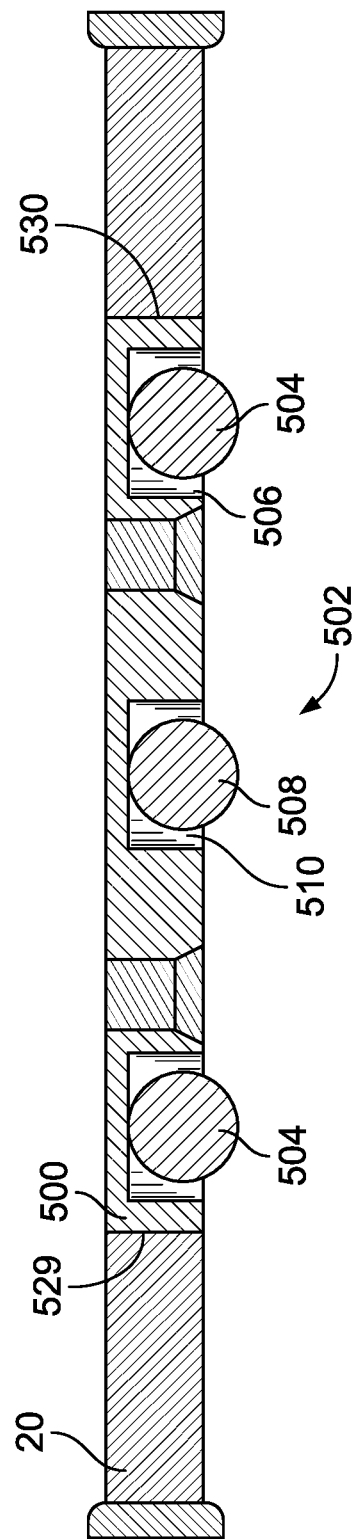
FIG. 7 illustrates a cross-sectional view of the stabilizer of FIG. 5 taken along line B-B of FIG. 6.

Referring to FIG. 7, a cross-sectional view of the stabilizer 500 taken along B-B of FIG. 6 is shown. The stabilizer 500 is implemented by an insert 529 that is received within an aperture 530 of the cutting tool 20. The insert 529 includes the bearing race 506 housing the first bearings 504 and the housing 510 housing the second bearing 508. While the stabilizer 500 extends through the aperture 530 of the cutting tool 20 to enable the stabilizer 500 to be directly coupled to the tool holder 12, the stabilizer 500 can alternatively define a recess that receives the insert 529. In such an example, the stabilizer 500 would be coupled to the tool holder 12 via the cutting tool 20 instead of being directly coupled to the tool holder 12.

Figure 8:
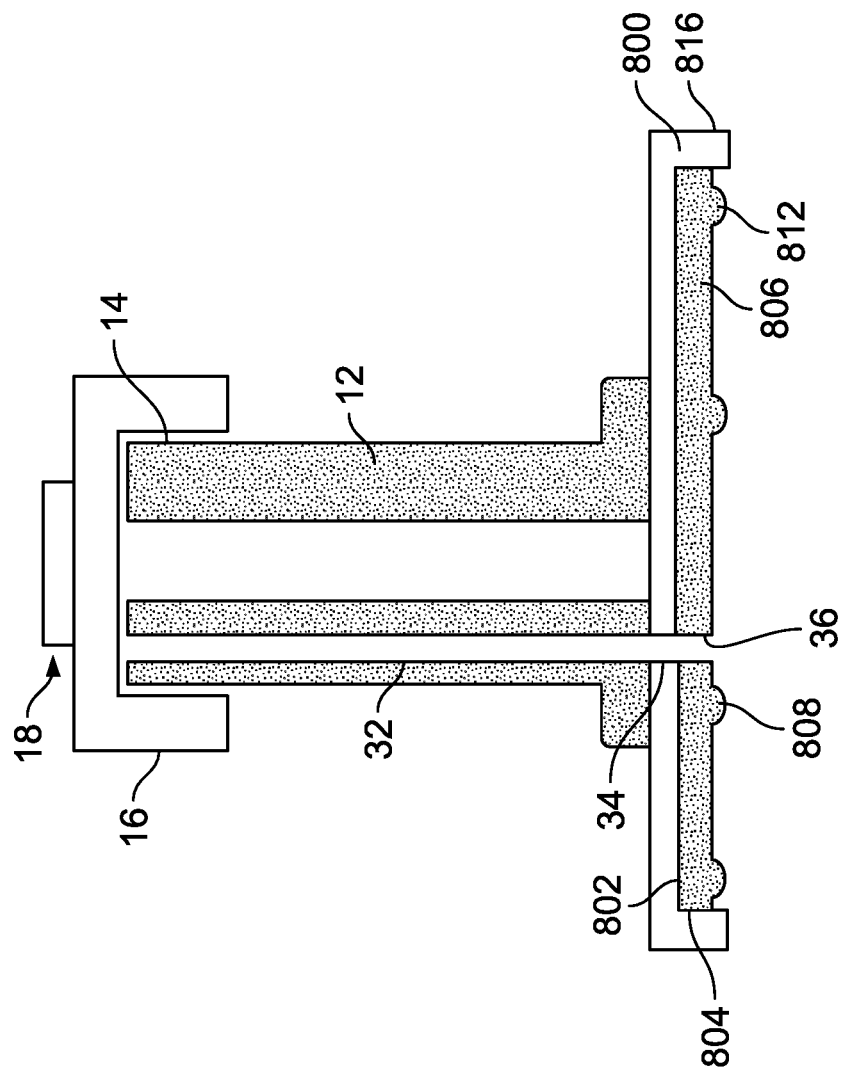
FIG. 8 illustrates a side view of another stabilizer including bearings disposed in concentric bearing races that can be used with the cutting tool assembly of FIG. 1.
Figure 9:
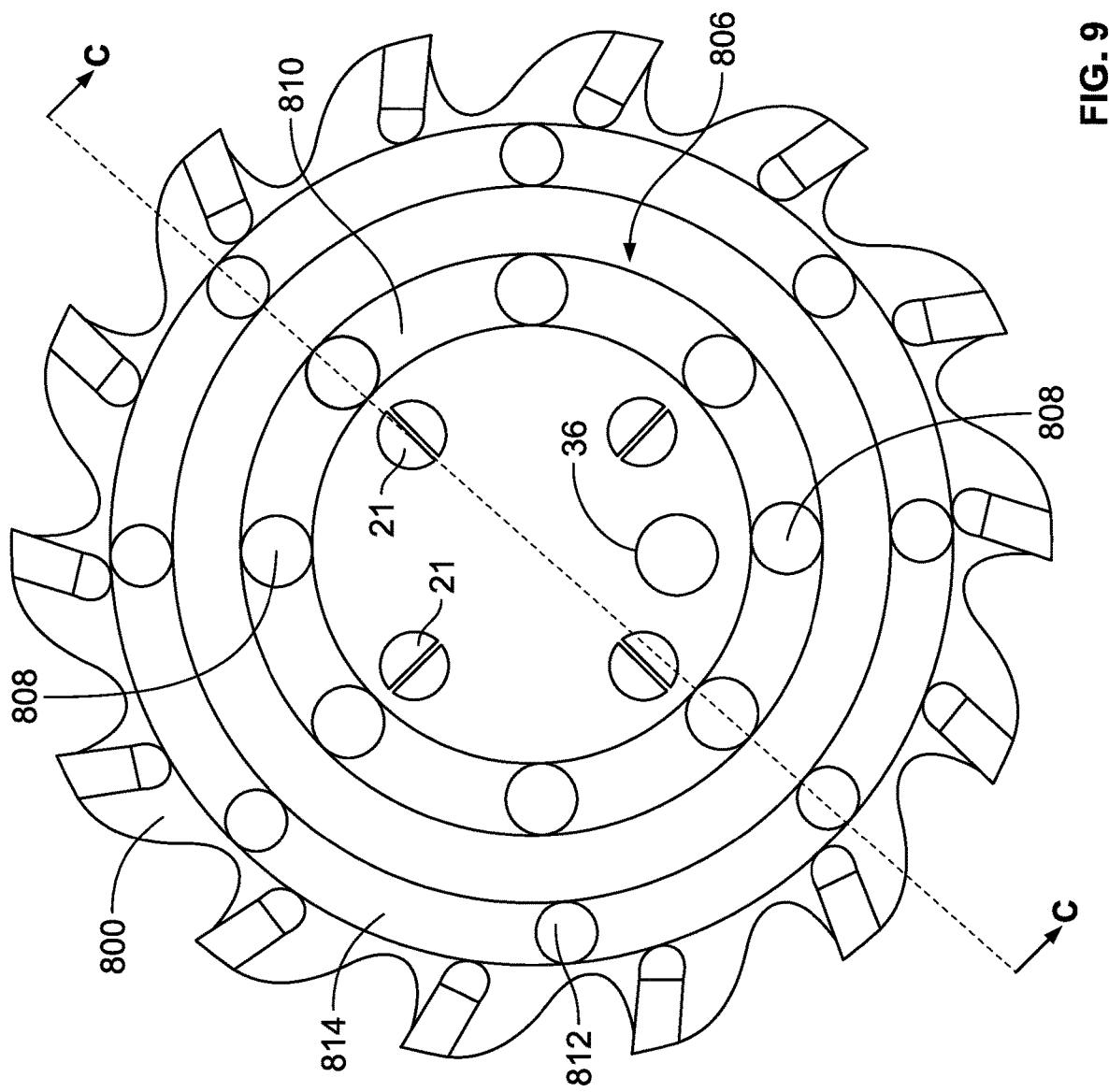
FIG. 9 illustrates a plan view of the stabilizer of FIG. 8.

Referring to FIGS. 8 and 9, a downward-facing cutting tool 800 is shown being coupled to the tool holder 12. The cutting tool 800 includes a recess 802 that receives a stabilizer 804. The stabilizer 804 includes a bearing surface 806. The bearing surface 806 includes first bearings 808 disposed in a first bearings race 810 (FIG. 9) and second bearings 812 disposed in a second bearings race 814 (FIG. 9). Radial channels are defined between the bearings 808, 812 that enable coolant or lubricant to flow therebetween when the bearings 806, 808 engage the reference surface R. The second bearings 812 are positioned adjacent an outer edge 816 of the cutting tool 800 to provide increased stability and support adjacent the outer edge 814 of the cutting tool 800 when the bearings 806, 808 engage the reference surface R.

Figure 10:
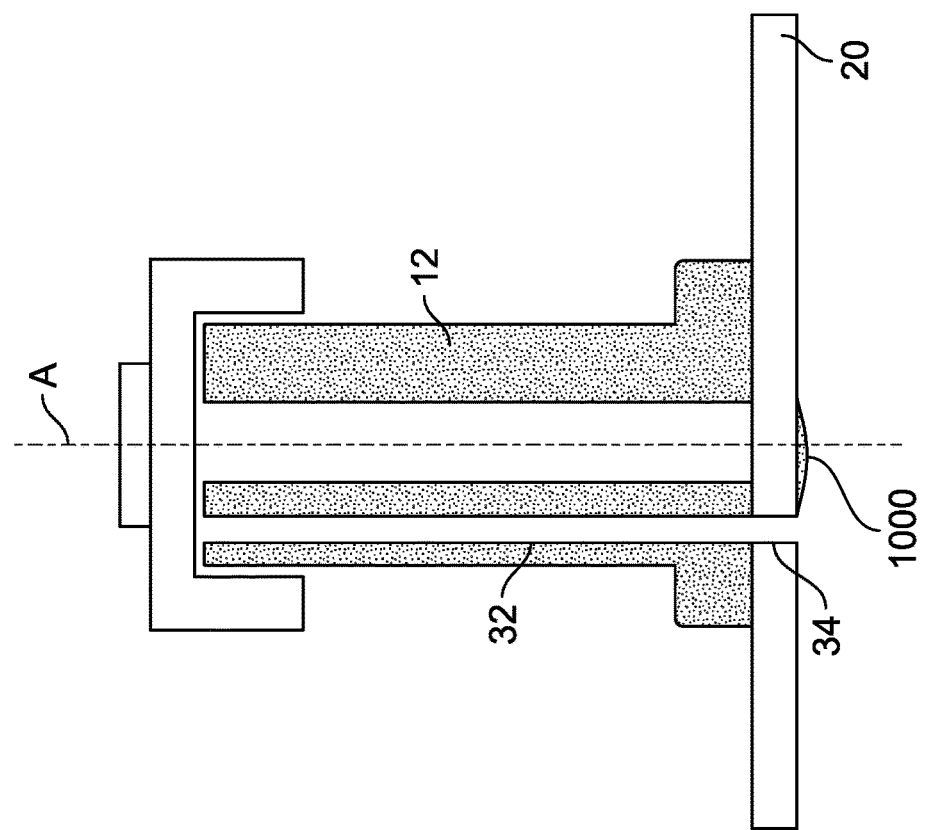
FIG. 10 illustrates a side view of another stabilizer including a protrusion that can be used with the cutting tool assembly of FIG. 1.
Figure 11:
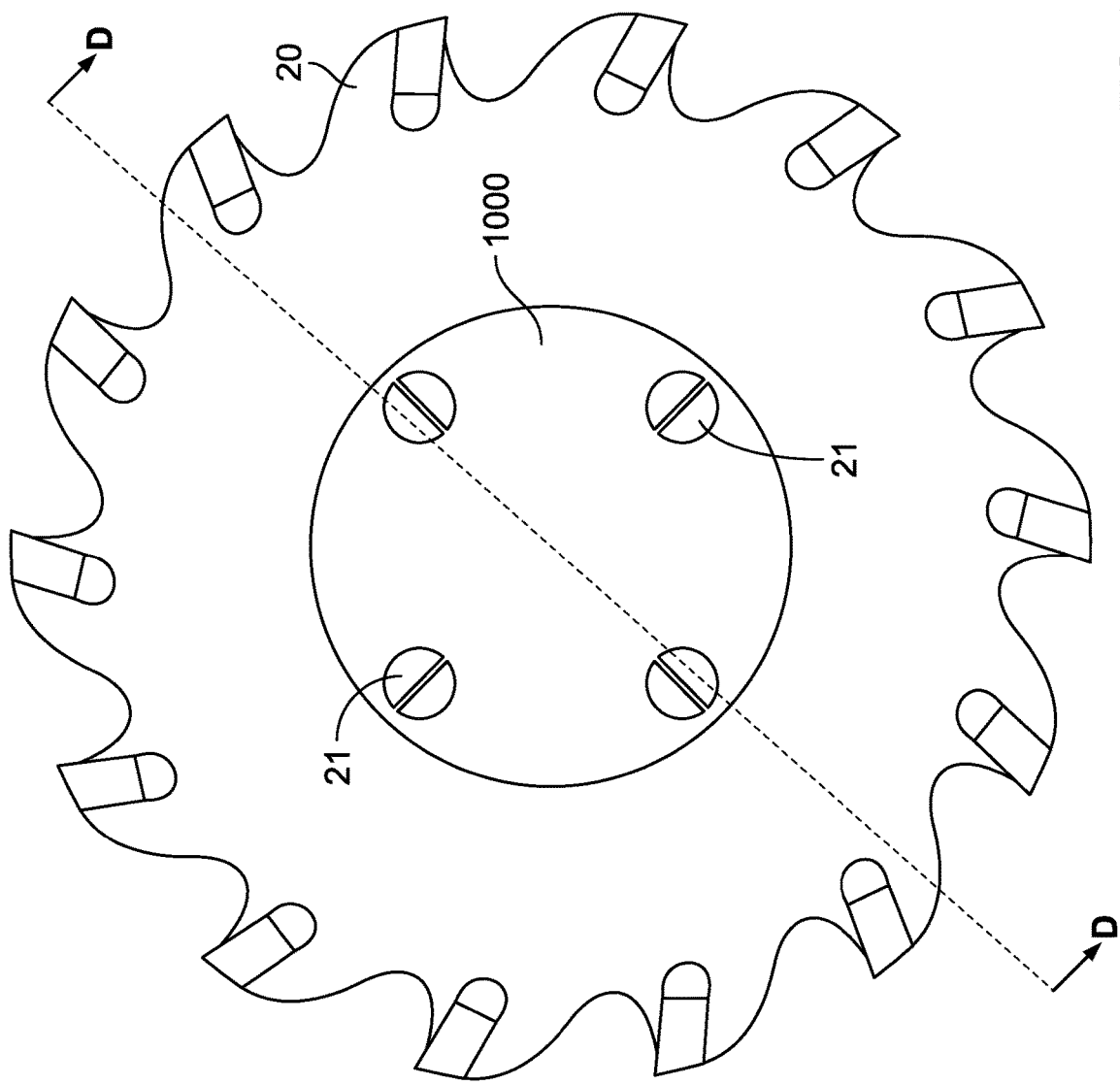
FIG. 11 illustrates a plan view of the stabilizer of FIG. 10.
Figure 12:
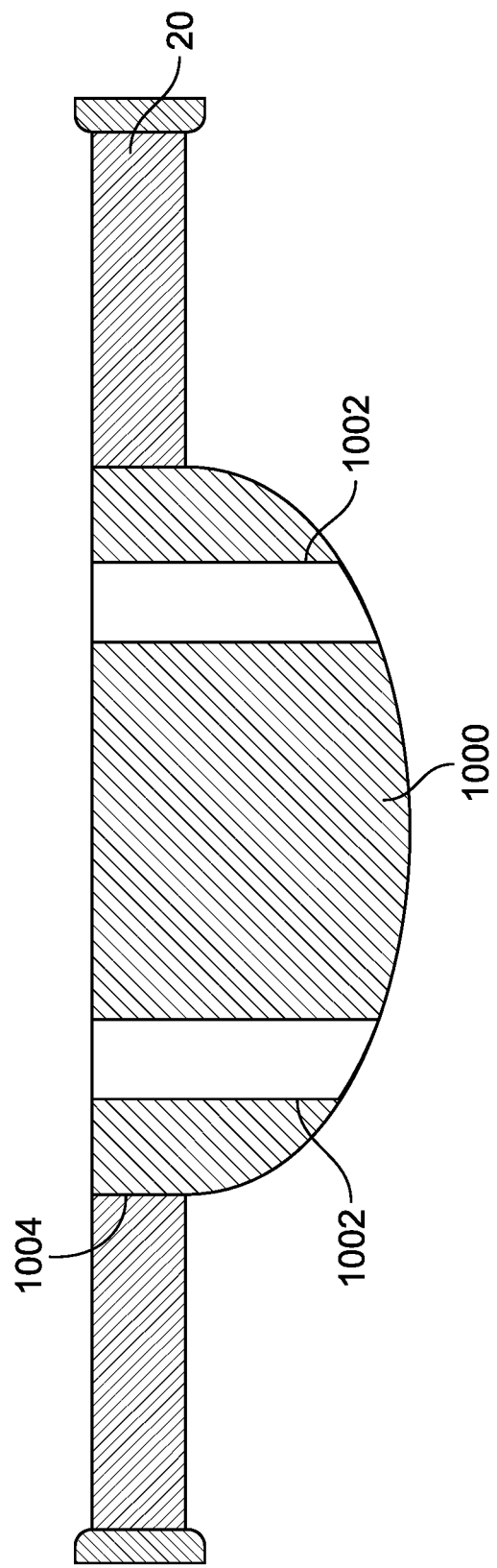
FIG. 12 illustrates a cross-sectional view of the stabilizer of FIG. 10 taken along line D-D of FIG. 11.

Referring to FIGS. 10, 11 and 12, another example stabilizer 1000 is shown coupled to the cutting tool 20. The stabilizer 1000 is a dome-like protrusion (a point stabilizer) that is centered about the rotational axis A. The stabilizer 1000 can have a rounded end or a pointed end. The stabilizer 1000 includes apertures 1002 (FIG. 12) that receive the fasteners 21 to couple the stabilizer 1000 to the tool holder 12. The stabilizer 1000 extends through an aperture 1004 (FIG. 12) of the cutting tool 20 to enable the stabilizer 1000 to be directly coupled to the tool holder 12. Alternatively, the stabilizer 1100 can be received within a recess of the cutting tool 20 and coupled indirectly to the tool holder 12 via the cutting tool 20.

Figure 13:
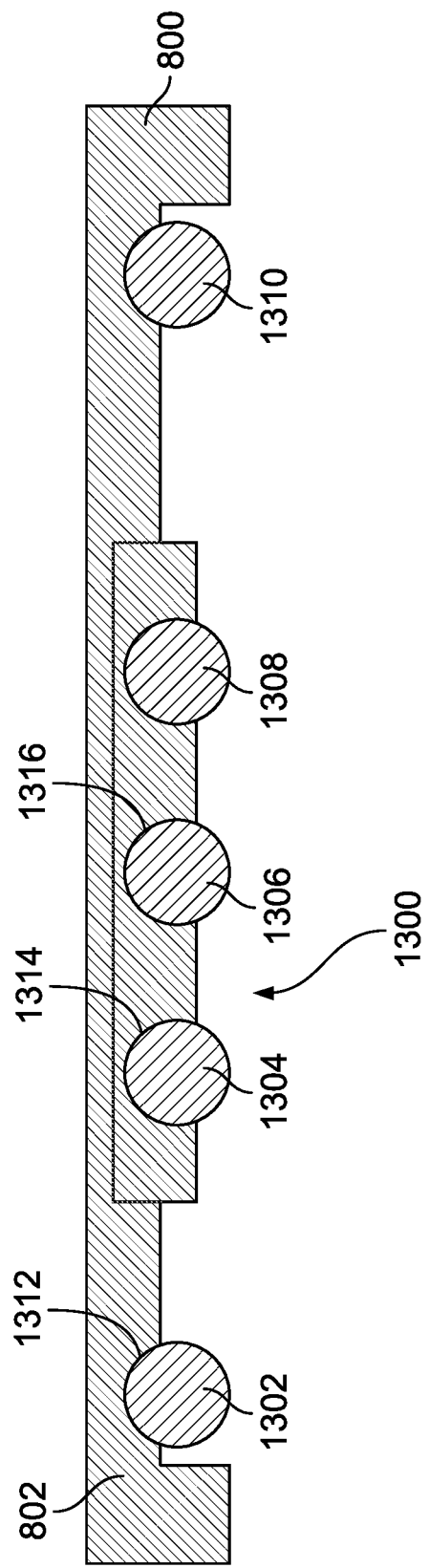
FIG. 13 illustrates another stabilizer including bearings that can be used to implement the teachings of this disclosure.

Referring to FIG. 13, another stabilizer 1300 is coupled to the downward-facing cutting tool 800. The cutting tool 800 includes the recess 802 that receives the stabilizer 1300. The stabilizer 1300 includes bearings 1302, 1304, 1306, 1308, 1310 disposed in bearing races 1312, 1314, 1316.

Figure 14:
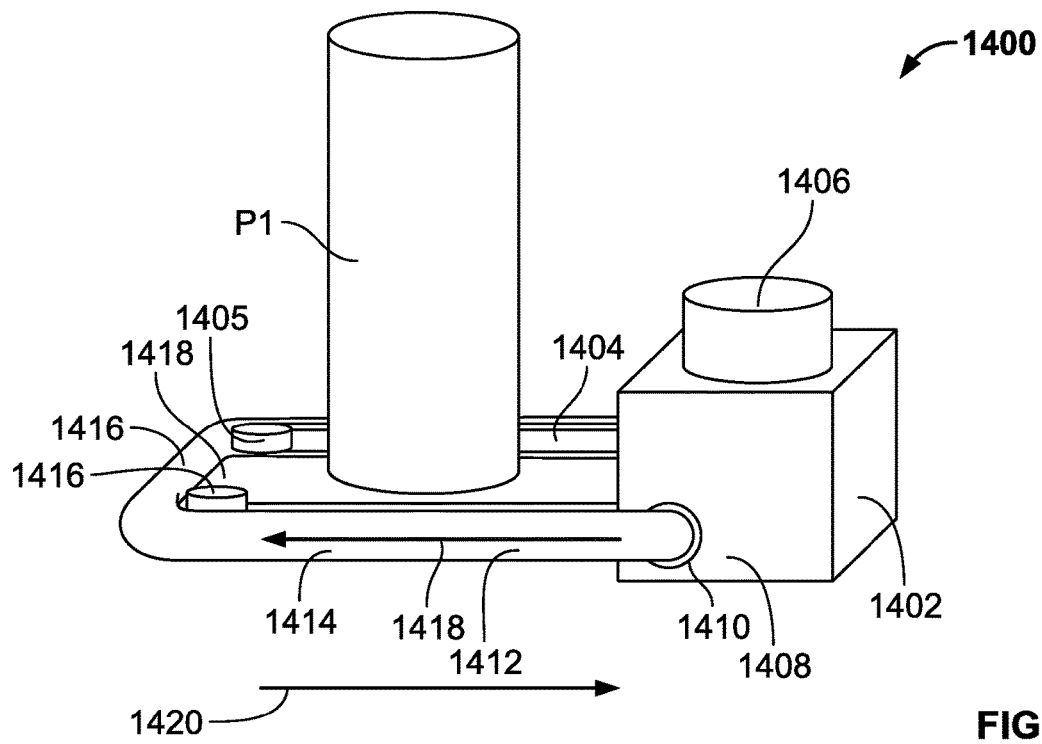
FIG. 14 illustrates another example implementation of a cutting tool assembly in accordance with another example of the present invention.

FIG. 14 illustrates another example implementation of a cutting tool assembly 1400 in accordance with another example of the present invention. In the example shown, the cutting tool assembly 1400 includes a tool holder 1402 and a pair of arms 1404. The tool holder 1402 includes a shank 1406. The shank 1406 may be attachable to the drive chuck 16. The arms 1404 extend from tool holder sides 1408. The arms 1404 include rounded ends 1405.

The tool holder sides 140 define tool holder apertures 1410. In the example shown, the cutting tool assembly 1400 includes a cutter 1412. The cutter 1412 is implemented as a wire cutter 1414. The wire cutter 1414 includes a cutting portion 1416. The wire cutter 1414 is positioned through the tool holder apertures 1410 and is positioned about the arms 1404. An opening 1418 is defined between the arms 1414 and the wire cutter 1414. The arms 1414 including the rounded ends 1405 may act as a guide for the wire cutter 1414.

In operation, the chuck 16 may guide the part P1 through the opening 1415. To cut the part P1, the wire cutter 1414 may be rotated in a direction generally indicated by arrow 1418. The chuck 16 may move the cutting tool assembly 1400 in a direction generally indicated by arrow 1420 to allow the cutting portion 1416 of the wire cutter 1414 to come into contact with and cut the part P1.

Figure 15:
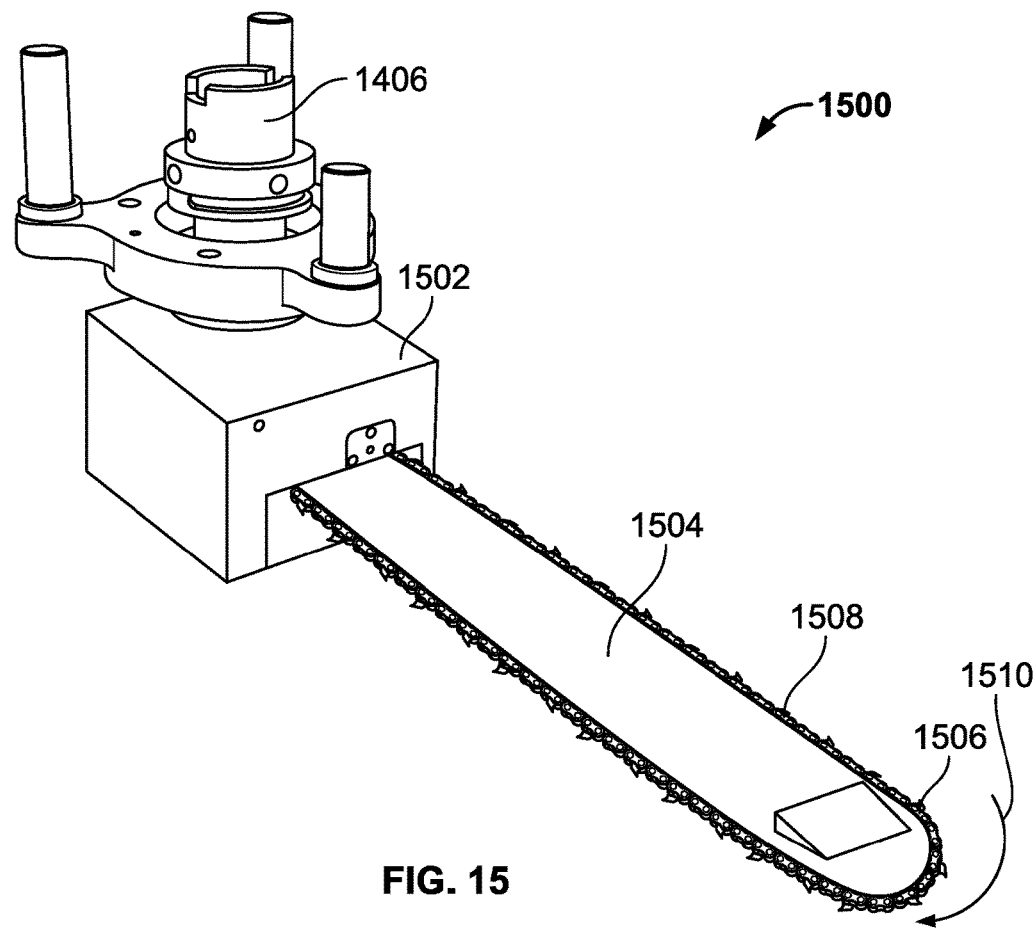
FIG. 15 illustrates another example implementation of a cutting tool assembly in accordance with another example of the present invention.

FIG. 15 illustrates another example implementation of a cutting tool assembly 1500 in accordance with another example of the present invention. In the example shown, the cutting tool assembly 1500 includes a tool holder 1502 and a blade platform 1504.

In the example shown, the cutting tool assembly 1500 includes a cutter 1506. The cutter 1506 is implemented as a chain blade 1508. The chain blade 1508 is receivable within the tool holder 1502 and is positioned about the blade platform 1504. The blade platform 1504 acts as a guide for the chain blade 1508.

In operation, the chain blade 1508 may be rotated in a direction generally indicated by arrow 1510. The chuck 16 may move the cutting tool assembly 1500 relative to, for example, the part p1, to allow the chain blade 1508 to come into contact with and cut the part P1.

Figure 16:
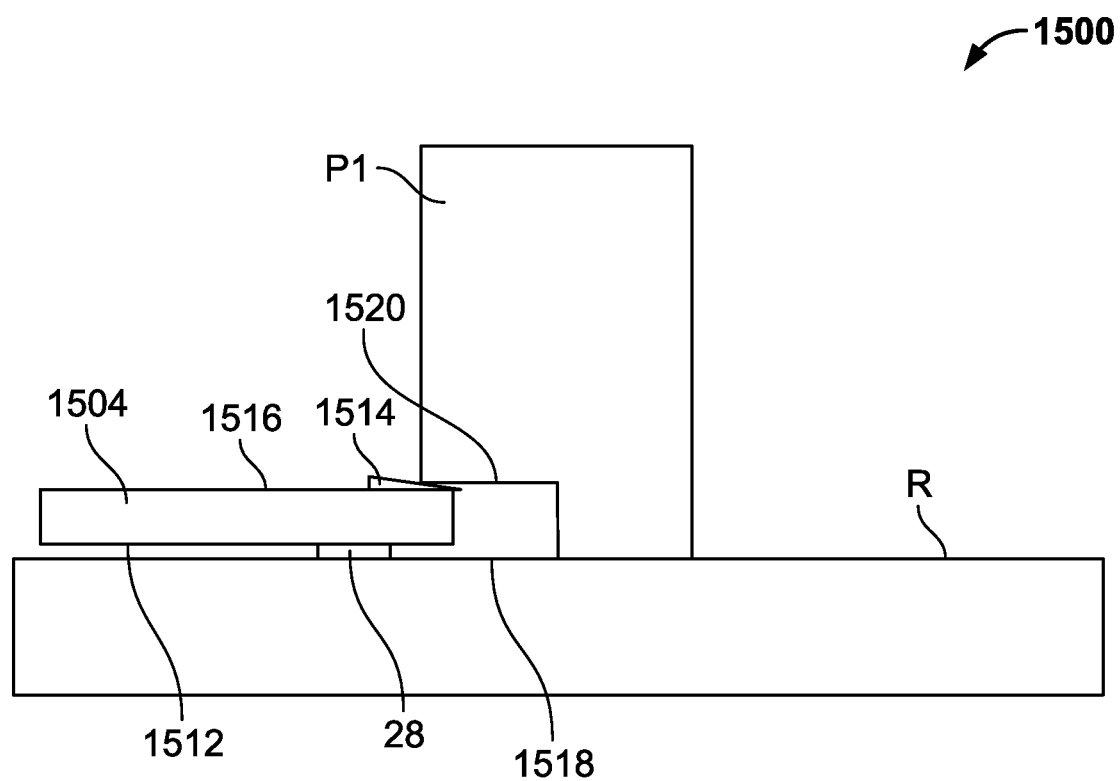
FIG. 16 illustrates an enlarged cross-sectional view of the blade platform of the cutting tool assembly and the part.

FIG. 16 illustrates an enlarged cross-sectional view of the blade platform 1504 of the cutting tool assembly 1500 and the part p1. In the example shown, the stabilizer 28 is coupled to a surface 1512 of the blade platform 1504. The stabilizer 28 is shown abutting the reference surface R. A guide 1514 is coupled to another surface 1516 of the blade platform 1504. The guide 1514 may be wedge shaped. In operation, when the chain blade 1508 is cutting the part p1 and a slot 1518 is formed in the part p1, the guide 1514 may interact with a surface 1520 of the part p1 to guide and/or stabilize the chain blade 1508 and/or the blade platform 1504 within the slot 1518 to allow the part p1 to continue to be cut by the chain blade 1508.

From the foregoing, it will be appreciated that the above disclosed apparatus, methods and articles of manufacture enable objects to be easily removed from a build platform of an example additive manufacturing machine using an example cutting tool even when the objects are densely arranged on the build platform, sometimes referred to as a "dense build." To remove the objects from the build platform, a horizontal cutter disc is used to cut the base of the respective objects. To provide increased stability and/or rigidity when the objects have a relatively large base or require a relatively long shaft to access the base of the objects, the examples disclosed herein provide the cutting tools with stabilizers that engage the build platform itself during the cutting operation. Thus, in contrast to some known examples in which the distal end of the cutting tool adjacent the build platform is unsupported, the examples disclosed herein provide additional rigidity and/or support for the cutting tools by structuring the distal end of the cutting tools to engage the build platform during cutting operations.

Additive manufacturing processes can be configured to produce parts on a substrate sometimes referred to as a build platform. To remove these parts from the build platform, the parts can be cut from the build platform using a cutting tool. The cutting tool may be implemented by a downward-facing cutter, a saw, a slotting tool, a milling cutter, a grooving cutter, a grooving tool or a slitting tool.

When a number of parts are built on the substrate and those parts are relatively tall, the shaft of the cutting tool carrying the cutter may also be relatively long to enable the cutting tool to be placed between immediately adjacent parts and at the base of the part being cut from the build platform. Similarly, when a number of parts are built on the substrate and those parts have a relatively large base, the cutting tool may have a relatively large effective cut thickness. In either of these known examples, the distal end of cutting tool is spaced from the build platform during the cutting operation and, thus, is not supported. When the shaft is relatively long or when the cutting tool has a relatively large effective cut thickness, known cutting tools tend to have poor rigidity, encounter frequent tool breakages, have reduced accuracy and/or have degraded surface finish because the distal end of the cutting tool is not supported.

To increase rigidity, to reduce tool breakages, to increase accuracy, to increase stabilization and to increase the quality of the surface finish, the examples disclosed herein relate to cutting tools having distal ends that engage and are supported by the build platform during cutting operations. As a result, the disclosed examples increase the stability of the cutting tool when a cutting operation takes place. To enable the distal end of the cutting tool to be supported by the build platform, the tool holder or the cutting tool carries a stabilizer that engages the build platform during a cutting operation. The stabilizer can be directly coupled to the tool holder. The stabilizer can alternatively be directly coupled to the cutting tool. In either of these examples, the stabilizers can be reused with another cutter after the useful life of the initially associated cutter has expired.

The disclosed stabilizers can be implemented by one or more of a glide ring(s), a bearing race(s) including a bearing(s), bearings or a point stabilizer(s). The glide ring can be an annular ring that is implemented by ceramic or another material that enables the cutting tool to easily rotate about the glide ring when the glide ring engages the build platform. When the stabilizer is implemented by a point stabilizer, the point stabilizer may be a protrusion having a rounded or pointed end that enables the cutting tool to easily rotate about the protrusion when the protrusion engages the build platform.

To deter chips produced during the cutting procedure from affecting the engagement between the distal end of the cutting tool and the build platform or, more generally, to push the chips out of the way of the stabilizer, in some examples, a skirt (a guard) surrounds the stabilizer. The skirt may be implemented as a ring, fins, a brush, a spring, a high density foam, or a rubber washer, etc. Additionally or alternatively, to deter chips produced during the cutting procedure from affecting the engagement between the stabilizer and the build platform, in some examples, the cutting tool is self-lubricated or intercooled to reduce heat associated with friction produced during cutting operations between the cutting tool and the build platform. The cutting tool can be self-lubricating with oil or any other substance. When the cutting tool is self-lubricated or intercooled, channels can be defined to enable the lubricant or coolant to flow to the cutting surface and between the stabilizer and the build platform. The lubricant and the coolant may smooth movement and otherwise reduce friction between the cutting tool and the build platform during cutting operations.

Further, while several examples have been disclosed herein, any features from any examples may be combined with or replaced by other features from other examples.

Moreover, while several examples have been disclosed herein, changes may be made to the disclosed examples within departing from the scope of the claims.

The invention claimed is:

1. A cutting tool assembly, comprising:
a tool holder having a rotational axis, the tool holder arranged for attachment to a drive source arranged to rotate the tool holder about the rotational axis and move the tool holder relative to a reference surface;
a cutting tool removably coupled to the tool holder to rotate with the tool holder about the rotational axis, the cutting tool including a cutting surface and having a first portion that faces toward the tool holder and a second portion that is opposite the first portion and faces away from the tool holder, the second portion arranged for placement adjacent to the reference surface; and
a stabilizer carried by the cutting tool, the stabilizer having a bearing surface arranged to be positioned against the reference surface,
wherein contact between the stabilizer and the reference surface stabilizes the cutting tool when the drive source rotates and/or moves the tool holder and the cutting tool relative to the reference surface.

2. The cutting tool assembly of claim 1, further comprising a first bearing race disposed in the cutting tool and surrounding the rotational axis, wherein the bearing surface includes a plurality of first bearings disposed in the first bearing race.

3. The cutting tool assembly of claim 2, further comprising a bearing housing disposed in the cutting tool, wherein the bearing surface includes a second bearing disposed in the housing.

4. The cutting tool assembly of claim 3, wherein the second bearing is disposed along the rotational axis.

5. The cutting tool assembly of claim 2, further comprising a plurality of channels defined between the plurality of first bearings, respectively, wherein the tool holder includes a fluid passage, and the cutting tool includes an aperture in fluid communication with the fluid passage, and wherein the fluid passage, the aperture, and the plurality of channels cooperate to permit a flow of a fluid into and through the fluid passage, through the aperture, through the plurality of channels, and out of the cutting tool.

6. The cutting tool assembly of claim 2, further comprising a second bearing race disposed in the cutting tool and surrounding the first bearing race, wherein the bearing surface includes a plurality of second bearings disposed in the second bearing race.

7. The cutting tool assembly of claim 1, wherein the second portion of the cutting tool includes a recess, and wherein at least a portion of the stabilizer is disposed in the recess such that the bearing surface is disposed outside of the recess and faces away from the tool holder.

8. The cutting tool assembly of claim 1, further including a guard surrounding at least a portion of the stabilizer.

9. The cutting tool assembly of claim 8, wherein the guard is compressible.

10. The cutting tool assembly of claim 1, wherein the bearing surface is made of a ceramic material.

11. A cutting tool assembly, comprising:
a drive source having a rotatable chuck assembly and movable relative to a reference surface;
a tool holder removably attachable to the chuck assembly, the tool holder being rotatable about a rotational axis;
a cutting tool removably coupled to the tool holder and arranged to rotate with the tool holder about the rotational axis, the cutting tool including a cutting surface and having a first portion that faces toward the tool holder and a second portion that is opposite the first portion and faces away from the tool holder, the second portion arranged for placement adjacent to the reference surface; and
a stabilizer carried by the cutting tool, the stabilizer having a bearing surface arranged to be positioned against the reference surface,
wherein contact between the stabilizer and the reference surface stabilizes the cutting tool when the drive source rotates and/or moves the tool holder and the cutting tool relative to the reference surface.

12. The cutting tool assembly of claim 11, further comprising a first bearing race disposed in the cutting tool and surrounding the rotational axis, wherein the bearing surface includes a plurality of first bearings disposed in the first bearing race.

13. The cutting tool assembly of claim 12, further comprising a bearing housing disposed in the cutting tool, wherein the bearing surface includes a second bearing disposed in the housing, and wherein the second bearing is disposed along the rotational axis.

14. The cutting tool assembly of claim 12, further comprising a plurality of channels defined between the plurality of first bearings, respectively, wherein the tool holder includes a fluid passage, and the cutting tool includes an aperture in fluid communication with the fluid passage, and wherein the fluid passage, the aperture, and the plurality of channels cooperate to permit a flow of a fluid into and through the fluid passage, through the aperture, through the plurality of channels, and out of the cutting tool.

15. The cutting tool assembly of claim 12, further comprising a second bearing race disposed in the cutting tool and surrounding the first bearing race, wherein the bearing surface includes a plurality of second bearings disposed in the second bearing race.

16. The cutting tool assembly of claim 11, wherein the second portion of the cutting tool includes a recess, and wherein at least a portion of the stabilizer is disposed in the recess such that the bearing surface is disposed outside of the recess and faces away from the tool holder.

17. The cutting tool assembly of claim 11, further including a guard surrounding at least a portion of the stabilizer.

18. The cutting tool assembly of claim 11, wherein the bearing surface is made of a ceramic material.

19. The cutting tool assembly of claim 11, wherein the stabilizer comprises a contact layer applied to the portion of the cutting tool, and wherein the contact layer is formed of a material that is dissimilar to a material of the cutting surface of the cutting tool.

20. A method, comprising:
providing a drive source having a rotatable chuck assembly and movable relative to a reference surface;
providing a tool holder removably attachable to the chuck assembly, the tool holder being rotatable about a rotational axis;
providing a cutting tool arranged to be removably coupled to the tool holder and arranged to rotate with the tool holder about the rotational axis, the cutting tool including a cutting surface and having a first portion that faces toward the tool holder and a second portion that is opposite the first portion and faces away from the tool holder;
securing a stabilizer to the cutting tool, the stabilizer having a bearing surface;

moving the drive source to position the cutting tool to a position adjacent to the reference surface;

rotating the tool holder and the cutting tool using the drive source; and bringing the stabilizer into contact with the reference surface to thereby stabilize the cutting tool.

\* \* \* \* \*